METHOD FOR PROCESSING PLANT PROTEIN

CROSS-REFERENCE TO RELATED APPLICATION

This is a continuation of Ser. No. 790,248 filed on Apr. 25, 1977, now abandoned.

The invention relates to a method of processing green plant protein, especially to an improved method for separating and purifying protein components from green plants.

In a broad sense all green plants having photosynthetic activity are considered suitable for processing according to the invention. The protein content thereof after isolation and, in given cases, after concentration can be utilized on a commercial scale.

The difficulty in recovery of green plant protein is in the separation of fractions having different value from accompanying substances and the adaptation of the valuable fractions for human or animal consumption. There is therefore a need to provide more economical methods on an industrial scale to improve the separation of green plant proteins.

It is known that the pressed juice obtained via pressing of green plants contains protein fractions coagulable under heat treatment and having different values. In the framework of these methods a separation of the chloroplastic and more valuable cytoplasmic protein fractions represents a rather complicated task. An improvement in the separation, however, is of decisive importance because the cytoplasmic protein fraction contains the most valuable protein fractions inherent in the plant material. These are not bound to chloroplastids and contain only low amounts of lipids and mineral accompanying substances. The cytoplasmic protein fraction is therefore suitable for use in human consumption because of its lack of odorous and aromatic substances which provide for a more appealing and therefore edible fraction. A main task in the processing of green plant protein is to increase the ratio of cytoplasm protein fraction to the amount of the protein available.

The chloroplastic protein fraction contains the major part of the minerals present in the accompanying substances, the major part of the lipid content, and practically all of the lipid soluble pigment substances of which chlorophyll, xantophyll and beta-carotene are the most significant. The processing of the latter protein fraction represents an independent technical task in the working up of the green plant protein. On the one hand, the separation of the accompanying substances from the protein which are present in the chloroplastic protein fraction should be solved in order to increase the protein content and to improve the quality. On the other hand, the processing of the lipid-soluble dye substances, the pigments for foddering purposes, should be elaborated. The importance of pigment substances has recently increased in closed livestock farming because the pigments are indispensable components in breeding certain kinds of animals in order to bring about their natural color.

The complicated process of fractionating by heat treatment for the separation of chloroplastic and cytoplasmic protein fractions has been suggested. It is, however, disadvantageous because the two fractions having different value but physically very analogous properties cannot be separated sharply. In the course of the heat treatment a part of the protein precipitate is damaged and the pigments and other accompanying substances in chloroplast fraction which detrimentally influence the properties necessary for human consumption, cannot be removed. Different organic solvents or a combination thereof have been proposed for the extraction of the pigments present in the chloroplastic protein fraction. The hitherto known processes, however, can be realized only on a laboratory scale.

An object of the present invention is to increase the amount of the cytoplasmic protein fraction which can be obtained on processing green plant protein from the pressed juice via pressing; a treatment of the chloroplastic protein fraction to improve the separation of pigment substances, and an improvement in the efficiency of the extraction, an improvement of the properties of the chloroplastic protein fraction which render the fraction more appealable for human consumption—after—fraction.

Summing up an increase in the ratio of the green plant protein inside the total protein mass having a quality identical to the cytoplasmic protein fraction on processing a given plant protein is a main object of the invention. A further important object is the processing of the pigment substances which can be obtained from the chloroplastic fraction via solvent extraction into a pigment concentrate suitable for industrial purposes.

According to the present invention for processing green plant protein, especially for the improvement of separation and purification of obtainable protein substances the following measures should be taken:

(a) the chloroplastic protein fraction is flocculated in the presence of inorganic agents promoting the flocculation at a temperature below 50° C. from the pressed juice which is obtained via pressing of the green plant material and is separated preferably in two steps;

(b) the extent of the heat treatment necessary to coagulate the protein and therewith effect the separation of the chloroplastic and cytoplasmic protein fractions is controlled by measuring the pigments concentration of the juice flowing off the separator with light absorption method;

(c) the separated chloroplastic protein fraction is treated in an aqueous suspension with a protease enzyme, if desired, after a treatment with a polar solvent;

(d) the chloroplastic protein fraction treated with the enzyme is extracted in a wet state with a polar solvent or a mixture of said solvents, the solvent is recirculated after regeneration into the process;

(e) the extracted pigment and lipoid concentrate is utilized after mixing it with an inert carrier or a carrier having a stabilizing effect;

(f) after separation of the chloroplastic protein fraction the remaining pressed juice containing the cytoplasmic protein fraction is treated to coagulate the protein at about 80° C. or the precipitation of the is carried out by treating the juice with a solvent;

(g) the coagulated proteins precipitated are utilized separately or mixed with each other after drying as animal fodder or for human nourishment.

The juice obtained by pressing the plant material is either heated to certain temperatures or treated with inorganic flocculation agents, such as the calcium, aluminum and iron salts or the hydroxides respectively, which are applied based on the green plant juice in an amount not exceeding 70 ppm or preferably based on the dry matter content of the pressed juice in an amount exceeding 15 atm. thereafter at 80 atm. As a result of the pressing 800 kg of pressed juice with 1.0 weight % dry matter content was obtained which had a crude protein content based on dry matter amounting to 36%.

600 ppm calcium hydroxide per kg dry matter content of pressed juice was added in form of a saturated aqueous solution to the juice and was heated to 46° C. The heating was effected by injecting steam with 2 atm pressure. The injection of steam was controlled by the temperature of the juice removed from the system. The chloroplastic protein precipitate was separated quantitatively and a fluffy precipitate was formed. The obtained sludge was separated in two steps. In the first step the sludge was conducted in a screw separator of decanter type where the bulk of the coagulated protein fraction was separated. The juice leaving the separator containing 0.5-1.0 volume % dilute sludge was added directly into a self discharging disc separator which is the second apparatus of the separation unit. The second juice is led off the separator under pressure in a way that the light extinction value of the clear juice leaving the separator was measured in 1:1 dilution with a photometer at 600 nm wavelength visible light with the aid of cuvettes of 1 cm size. The discharge time periods of the separator was controlled in a manner that between two discharge periods the sludge was filled not more than 50% of its whole volume with juice. In the pipeline of the cleared juice containing chlorophyll an inserted photometer measures the reduction of the light intensity. In the presence of chlorophyll, therefore, the photocurrent intensifies and at an extinction value higher than 0.05 (at wavelength 600 nm) this photometric regulation decreases the efficiency of the feeding pump of the separator unit and simultaneously a forced discharge takes place in the second separator. Thus the separation of the chloroplastic protein fraction can be controlled accurately.

The dilute sludge obtained periodically in the second separator has an increased mother liquor content therefore it is recirculated into the buffer tank which is placed before the feeding pump of the separator unit. Sludge is removed only from the first decanter separator with a controlled water content. The sludge obtained from the first separator is adjusted to a dry matter content of 30.0 to 35.0 % whereas the dry matter content of the sludge obtained from the disc separator was 10 to 15% by weight.

The chloroplastic protein fraction separated in the above manner amounts to 142 kg with a 30% by weight dry matter content. 45.0 mg of butyl hydroxy anisole is added to each dry matter kg of the chloroplastic protein fraction and after homogenization the obtained product is dried in a flash type drying apparatus, inlet air temperature 250°-280° C. and outlet air temperature 105°-110° C.

The weight of the dried product amounts to 45 kg and had a following composition:

| water | 6% |
| crude protein | 55% |
| crude lipids | 4% |
| minerals | 12% |
| nitrogen free extract | 23% |
| beta carotene | 800 mg/kg |
| xantophyll | 1800 mg/kg |

After the separation of the chloroplastic protein fraction the obtained purified juice was heated with direct steam injection (2 atm) to 80° C. and the coagulated cytoplasmic protein fraction is separated from the juice in an apparatus identical with the separator for chloroplastic protein fraction. The amount of the protein precipitate in wet state separated in two steps amounts to 45 kg, had a yellowish white colour and a dry matter content of about 30% by weight. The drying was effected in a flash drier apparatus inlet air temperature 220° C., outlet air temperature 105° C. The formed 14.5 kg of cytoplasmic protein fraction had a following composition:

| water | 7% |
| crude protein | 65% |
| crude lipids | 0.4% |
| minerals | 3.5% |
| nitrogen free extract | 24.1% |
| chlorophyll, beta-carotene and xantophyll | — |

Alternatively the separation can be carried out in one step in a decanter separator. The yield of the cytoplasmic protein fraction is then decreased.

The utilization of the chloroplastic protein fraction is advantageous e.g. in the foddering of egg-laying poultry where the protein demand is limited and thus a complete substitution of carotenoid pigments is possible. The cytoplasmic protein fraction is suitable without any limitation to substitute optional protein carrier. After refinement, utilization in human nourishment is possible as well.

After separation of the chloroplastic and cytoplasmic protein fractions—the weight of the condensed steam included—690 kg of mother liquor is formed. This was evaporated in a multistage vacuum evaporator until a dry matter content of about 50% by weight of the residue and this concentrate can be mixed in a proper proportion to the fibrous presscake prior to drying thereof.

EXAMPLE 2

100 kg of alfalfa was processed according to Example 1. The chloroplastic and cytoplasmic protein fractions were separated.

The green sludge isolated at the first separator of the chloroplastic protein fraction separation is contacted in a stirring apparatus coupled to the decanter with a solvent. A fivefold amount (220 kg) of acetone and 25.0 mg/kg dry matter butyl hydroxy toluene is added to the sludge based on its dry matter content in a ratio proportional to its formation rate. The wet sludge is stirred for 15 minutes with solvent, thereafter in the decanting separator the sludge was isolated. The extraction liquid amounting to 265 kg is conducted to a tank and the residue free from solvent amounting to 100 kg was suspended in 200 liter of water and the pH value thereof was adjusted to 1.8 and heated to 37° C. 1 g of crystalline pepsine was added to the mixture and treated therewith for 3 hours. Thereafter the sludge was separated in a decanter separator and the mother liquor, in a nearly neutralized state was intermixed with dilute juice to be vacuum evaporated. 90 kg of sludge was extracted with 2×150 kg of acetone. After the extractions took place the solvent was separated and after regeneration was recirculated into the process. The extraction residue was washed free from the solvent and dried in a flash drier apparatus air inlet temperature 220° C. and air outlet temperature 105° C.

The product weighing 31 kg is pale brownish-yellow with the following composition:

| | |
|---|---|
| water | 7% |
| crude protein | 70% |
| minerals | 6.0% |
| total lipids | 1.5% |
| nitrogen free extract | 15.5% |

265 kg of extraction liquid is conducted into a distilling apparatus and 2.0 g butyl hydroxy toluene is added based on 10 kg of dry matter content. The solvent was distilled at atmospheric pressure and thus regenerated. The regenerated acetone was recirculated into the extraction step. 25 kg of distillation residue was adjusted with sodium carbonate to 7.5 pH value and was mixed in a homogenizing apparatus with 5 kg of dextrine, 0.1 kg of sodium alginate and 0.9 kg of gelatine containing solution.

The homogenized mixture was dried in a spray drier apparatus furnished with a spray nozzle, air inlet temperature 200° C. and air outlet temperature 105° C. The composition of the obtained product weighing 14 kg was the following:

| | |
|---|---|
| water | 6% |
| crude protein | 16.5% |
| minerals | 22.0% |
| beta-carotene | 2500 mg/kg |
| xantophyll | 4000 mg/kg |

After separation of the cytoplasmic protein fraction the obtained mother liquor was processed according to Example 1.

The extracted chloroplastic protein fraction is suitable to substitute in animal foddering with an optional protein carrier in any quantity and using in foddering optional animal species.

The cytoplasmic protein fraction can be utilized as well without limitation as a substitute for any protein carrier for human nourishing purposes. The chloroplastic protein concentrate prepared by enzymatic hydrolysis combined with extraction can be dried together with the cytoplasmic protein fraction and the two fractions can be used in combination. The pigment concentrate is suitable for substituting carotenoid pigments in broiler and egg-layer poultry fodder and can be employed independently from the chloroplastic protein fraction in animal breeding.

EXAMPLE 3

1000 kg of *Amaranthus mantegazzianus* having a dry matter content amounting to 18.0% by weight and a crude protein content of 3.9%.

The chloroplastic protein fraction was precipitated according to Example 1. 47 kg of wet sludge was diluted with water to 100 kg total weight. The temperature of the mixture was adjusted to 40° C. and the pH value thereof with sodium hydroxide to 7.8. 32 g of a suspension of an alkaline protease enzyme having an Anson-activity of 4–5 was added to the mixture and mixed for 30 minutes. After the protease treatment the pH value was adjusted with a mineral acid to 4.5 and the mixture was separated. As a result of the separation 42 kg of sludge and 60 kg of mother liquor was obtained, the latter being processed according to Example 1.

The sludge was extracted three times with 100 kg of isopropanol. The extraction liquids obtained in each extraction step were united, the solvent was distilled off and recirculated into the process. The distillation residue was processed according to Example 2, as additive 2 kg of dextrine, 0.1 kg of sodium alginate and 0.5 kg of gelatine were employed dissolved in a solution. The obtained product amounted to 8 kg and contained 1600 mg/kg of beta-carotene and 3500 mg/kg of xantophyll.

The extracted residue was united with the cytoplasmic protein fraction. This fraction was precipitated by means of treating it with a solvent.

The separated juice obtained after removing of the chloroplastic protein fraction was evaporated in a vacuum evaporator until 30% by weight dry matter content and the concentrate thus obtained weighing 100 kg was added together with the extracted chloroplastic protein fraction into 150 kg of isopropanol and stirred for an hour. The mixture was thereafter separated, washed twice with water and the solvent and aqueous solvent were distilled at atmospheric pressure. The regenerated solvent was backfed into the process. The protein precipitate washed with water free from solvent and was dried. The weight of the protein concentrate was 27 kg, with the following composition:

| | |
|---|---|
| water | 6% |
| crude protein | 75% |
| minerals | 6% |
| crude lipids | 0.2% |
| beta-carotene, xantophyll | — |

EXAMPLE 4

The preparation steps of the pigment concentrate were combined to obtain a product suitable to intermix it with the usual fodders and to obtain a product having satisfactory shelf life. The carriers of the pigment concentrate were selected and the drying of the suspension prepared with these carriers and the pigments was controlled in a manner that the dried endproduct should be free-flowable with a proper size distribution. In the course of the preparation of the concentrate such measures were carried out that the surface of the prepared granules should be covered with a gastight material layer that is a product in a quasi-capsulated state was prepared. This gastight layer prevents the penetration of the oxygen into the body of the product and ensures and increases protection in addition to the use of an antioxidant.

The proper additives satisfying the above requirements are dextrine, gelatine, sodium caseinate and sodium alginate. Using these additives the pigment concentrate can be obtained in a quasi-capsulated form. Another advantage of these additives is that they form without vacuum evaporation a sludge having proper viscosity which can be dried into a product having a preferable size distribution by means of a spray drier furnished with a spray nozzle or by means of a centrifugal spray drier.

The sludge prepared for spray drying is adjusted to a dry matter content amounting to 30–40% by weight. The viscosity of the suspension obtained is about 28°–32° E (Engler Grade) (at 40° C.). This suspension obtained was dried with a spray drier furnished with a single or two nozzles, an inert gas was used for spray drying having a pressure of 2.0–2.5 atm. In case a centrifugal spray drier is used then the inlet air temperature was 210°-230° C. and the outlet temperature 100°-105° C.

The size distribution of the dried product was that it passed in its bulk through a sieve having a 0.2-0.35 aperture size. The pigment concentrate is stable, stored at room temperature far more then a year less than 10% by weight of its original carotenoid pigment content was lost.

What we claim is:

1. A process for the separation and purification of plant proteins from the pressed juice of green plants comprising
   (a) coagulating a chloroplastic protein fraction in form of a green sludge from said juice at a temperature below 50° C. in the presence of an inorganic flocculating agent;
   (b) separating said green sludge from a remaining juice and subjecting the sludge in an aqueous suspension to a protease enzyme until about 5% by weight of the protein components are degraded;
   (c) extracting said sludge after enzymatic treatment with at least one polar solvent such that the water to solvent ratio is at least 80:20 to remove pigments and lipids from protein;
   (d) isolating an extracted pigment and a lipid concentrate by distilling off the solvent and drying the residue, and
   (e) isolating a cytoplasmic protein fraction by coagulating the remaining juice from step (b) at a temperature of about 80° C., separating and drying the protein precipitate.

2. The process of claim 1 wherein the green sludge is in an aqueous suspension having 15-25% by weight dry matter content in an acidic or alkaline medium with said protease enzyme.

3. The process of claim 1 wherein the protease enzyme used in an acidic medium is selected from the group consisting of pepsin, papain and a proteolytic enzyme having fungal or bacterial origin.

4. The process of claim 1 wherein the protease enzyme used in a medium of pH 7.5-8.0 is trypsin or a protease enzyme which is derived from a fungus or bacterium.

5. A process for the separation and purification of plant proteins from the pressed juice of green plants comprising
   (a) coagulating a chloroplastic protein fraction in form of a green sludge from said juice at a temperature below 50° C. in the presence of an inorganic flocculating agent;
   (b) separating the green sludge from a remaining juice and extracting said separated sludge with at least one polar solvent;
   (c) subjecting the extracted sludge in an aqueous suspension with a protease enzyme until about 5% by weight of the protein components are degraded;
   (d) extracting further said sludge after enzymatic treatment with at least one polar solvent such that the water to solvent ratio is at least 80:20;
   (e) isolating the extracting pigment and lipid concentrate by distilling off the extraction liquid and drying the residue, and
   (f) isolating a cytoplasmic protein fraction by coagulating the remaining juice from step (b) at a temperature of about 80° C., separating and drying the protein precipitate.

6. The process of claim 5 wherein the extraction of the enzymatically treated sludge is carried out with water-solvent mixture having a water-solvent ratio corresponding to about 80:20 by volume and thereafter increasing the solvent and decreasing the water content of the extracting solvent, respectively.

7. The process of claim 5 wherein the polar solvent used in the course of the extractions is selected from the group consisting of methanol, ethanol, propanol, isopropanol, acetone, methylethylketone, dimethylsulfoxide and mixtures thereof.

8. A process for the separation and purification of plant proteins from the pressed juice of green plants comprising
   (a) coagulating a chloroplastic protein fraction in form of a green sludge from said juice at a temperature below 50° C. in the presence of an inorganic flocculating agent;
   (b) separating said green sludge from a remaining juice first in a decanter and then in a self-discharging disc separator;
   (c) controlling the time period necessary for heat treating the juice in step (a) by measuring the pigment concentration of the liquid phase flowing off by means of measuring the light absorption value thereof;
   (d) extracting said separated sludge from step (b) with at least one polar solvent;
   (e) subjecting said extracted sludge in an aqueous suspension with a protease enzyme until about 5% by weight of the protein components are degraded.
   (f) extracting said sludge after enzymatic treatment with at least one polar solvent such that the water to solvent ratio is at least 80:20;
   (g) isolating an extracted pigment and lipid concentrate by distilling off the extraction liquid and drying the residue, and
   (h) isolating a cytoplasmic protein fraction by coagulating the remaining juice from step (b) at a temperature of about 80° C., separating and drying the protein precipitate.

9. The process of claim 8 wherein an inorganic flocculating agent is selected from the group consisting of water-soluble calcium-, aluminium- and iron salts or hydroxides based on the green plant juice in an amount not exceeding 70 ppm and based on the dry matter content of the plant juice in an amount not exceeding 800 ppm per kg of dry matter.

10. The process of claim 8 wherein the chloroplastic protein fraction is coagulated in form of a green sludge at 46°-48° C.

* * * * *

United States Patent [19]

Millar et al.

[11] 4,250,198
[45] Feb. 10, 1981

[54] MEAT SNACK ANALOG

[75] Inventors: Donald B. Millar, Cobourg; Edward D. Murray, Winnipeg; Terrence J. Maurice, Colborne, all of Canada

[73] Assignee: General Foods, Limited, Toronto, Canada

[21] Appl. No.: 51,787

[22] Filed: Jun. 25, 1979

[51] Int. Cl.³ .......................... A23J 3/00; A23D 5/00
[52] U.S. Cl. .................................. 426/335; 426/104; 426/602; 426/656; 426/613; 426/284; 426/802
[58] Field of Search ............... 426/104, 656, 802, 276, 426/512, 602, 613, 284, 335

[56] References Cited

U.S. PATENT DOCUMENTS

| | | | |
|---|---|---|---|
| 2,802,737 | 8/1957 | Anson et al. | 426/656 X |
| 3,713,837 | 1/1973 | Leidy et al. | 426/802 X |
| 3,836,678 | 9/1974 | Leidy et al. | 426/656 X |
| 3,922,352 | 11/1975 | Tewey et al. | 426/802 X |
| 4,133,897 | 1/1979 | Flanyak et al. | 426/802 X |
| 4,143,164 | 3/1979 | Shanbhaz et al. | 426/613 X |
| 4,169,090 | 9/1979 | Murray et al. | 426/656 X |
| 4,178,394 | 12/1979 | Kumar | 426/656 |

Primary Examiner—Robert A. Yoncoskie
Attorney, Agent, or Firm—Sim & McBurney

[57] ABSTRACT

A nutritious tasty meat snack analog having characteristics simulating the meat-based product is made from non-meat protein material, fat, water, spices, colorings and flavorings. The fat is emulsified in water with a proteinaceous food component emulsifier, preferably a protein micellar mass, and blended with an aqueous dispersion of a protein binder, which preferably is sodium caseinate or a protein micellar mass, and fibrous protein, preferably protein fibres formed from a protein micellar mass. The blend, which also includes the spices, colorings and flavorings, preferably along with preservatives, added at various stages of processing, and in the form of a stiff paste with fibrous particles distributed therethrough is then stuffed into appropriate casings, smoked and dried under controlled temperatures and humidity conditions to the desired moisture content, preferably about 15 to about 25% by weight, tempered and cut and packaged in a moisture-proof package.

18 Claims, No Drawings